United States Patent [19]
Ernst et al.

[11] Patent Number: 5,322,496
[45] Date of Patent: Jun. 21, 1994

[54] METHOD FOR HANDLING BUSINESS FORMS

[75] Inventors: Jeffrey P. Ernst, Carol Stream; Jerome F. Andersen, Chicago; William R. Schoenherr, Hinsdale, all of Ill.

[73] Assignee: Wallace Computer Services, Inc., Hillside, Ill.

[21] Appl. No.: 60,795

[22] Filed: Mar. 12, 1993

[51] Int. Cl.⁵ .................. B41F 13/54; B41J 15/00; B65H 37/04; B65H 37/06
[52] U.S. Cl. ................. 493/410; 156/157; 414/343; 414/346
[58] Field of Search ........ 493/410; 156/157; 414/343, 346, 398, 798.2

[56] References Cited

U.S. PATENT DOCUMENTS

| | | | |
|---|---|---|---|
| 2,506,004 | 5/1950 | Ward et al. | 270/39 |
| 2,738,983 | 3/1956 | Essig | 280/659 |
| 3,236,162 | 2/1966 | Reist | 414/798.2 |
| 3,741,413 | 6/1973 | Friel | 414/398 |
| 3,883,131 | 5/1975 | Anderson et al. | 493/433 |
| 3,986,614 | 10/1976 | Fernandez-Rana et al. | 414/798.2 |
| 4,181,052 | 1/1980 | Kopp | 83/79 |
| 4,586,703 | 5/1986 | McAnelly | 270/39 |
| 4,871,157 | 10/1989 | Hermann et al. | 270/39 |
| 5,044,873 | 9/1991 | Vijuk | 414/792.5 |
| 5,061,233 | 10/1991 | Shultz et al. | 493/410 |

FOREIGN PATENT DOCUMENTS 2240684 2/1974 Fed. Rep. of Germany .
2703959 8/1978 Fed. Rep. of Germany .

OTHER PUBLICATIONS

Brochure: Laserman TM Printed Forms Transport, Wallace Computer Services Inc. Feb. 1992.

Primary Examiner—William E. Terrell
Attorney, Agent, or Firm—Tilton, Fallon, Lungmus & Chestnut

[57] ABSTRACT

Apparatus and method for handling compacted business forms including a receiver having a horizontally disposed receiving surface and posts at one end thereof for the receipt of a dolly adapted to delimit and confine a predetermined number of forms on the receiver horizontal surface. The receiver is pivotable to position the dolly on the floor with the predetermined number of forms existing as a stack. Confinement straps associated with the dolly hold the stack in place while the dolly is separated from the receiver and relocated to a processing machine for performing further operations on the forms, the dolly being equipped with mounting holes for returning the dolly on a hand truck to the receiver.

9 Claims, 7 Drawing Sheets

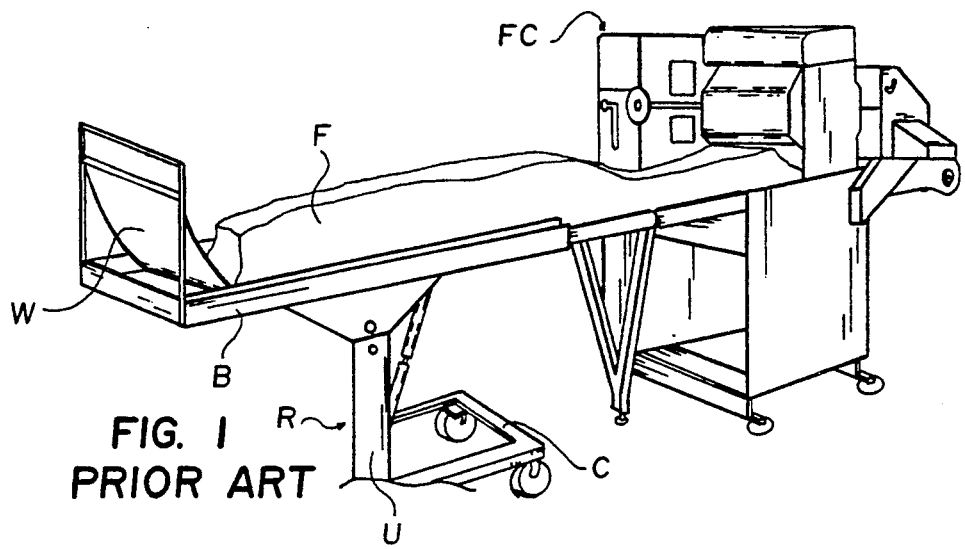
FIG. 1 PRIOR ART
FIG. 2 PRIOR ART
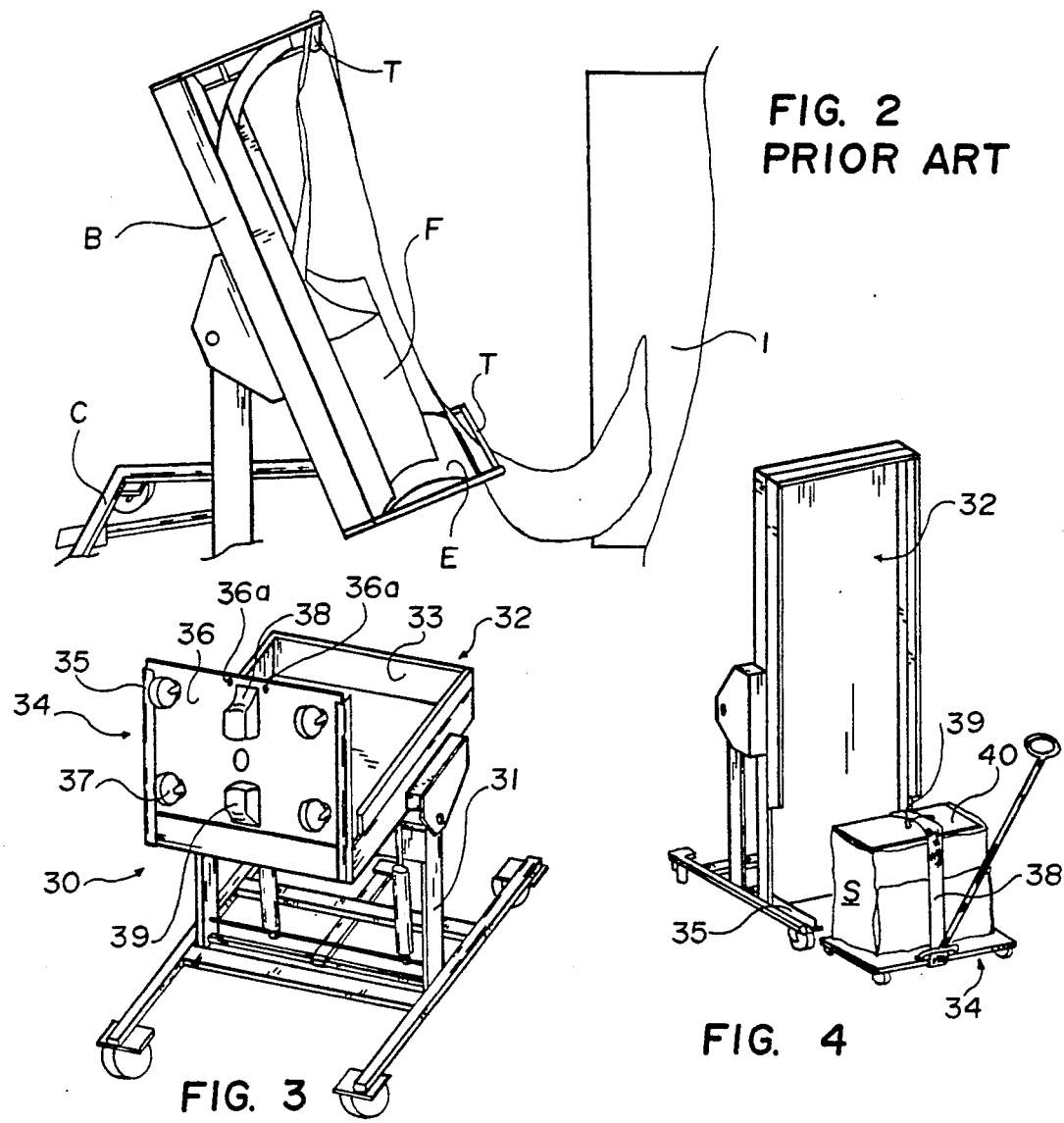
FIG. 3
FIG. 4

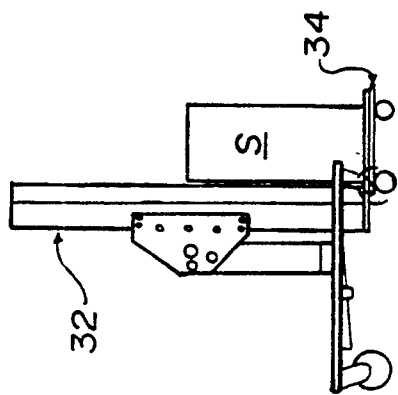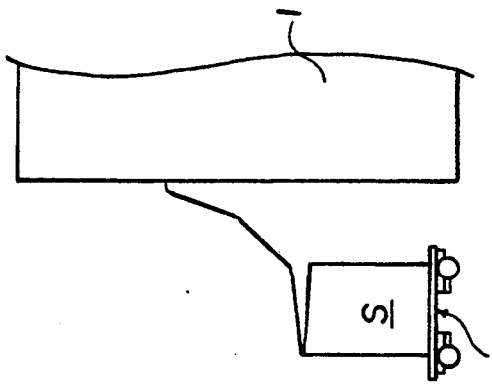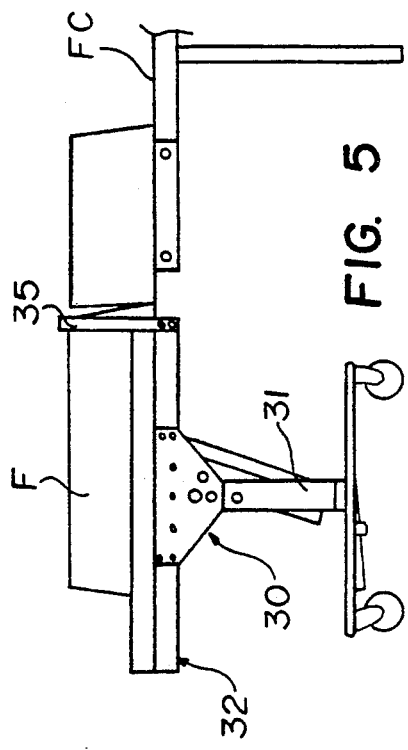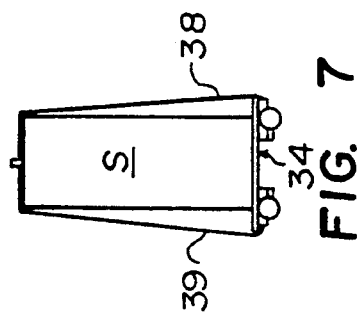

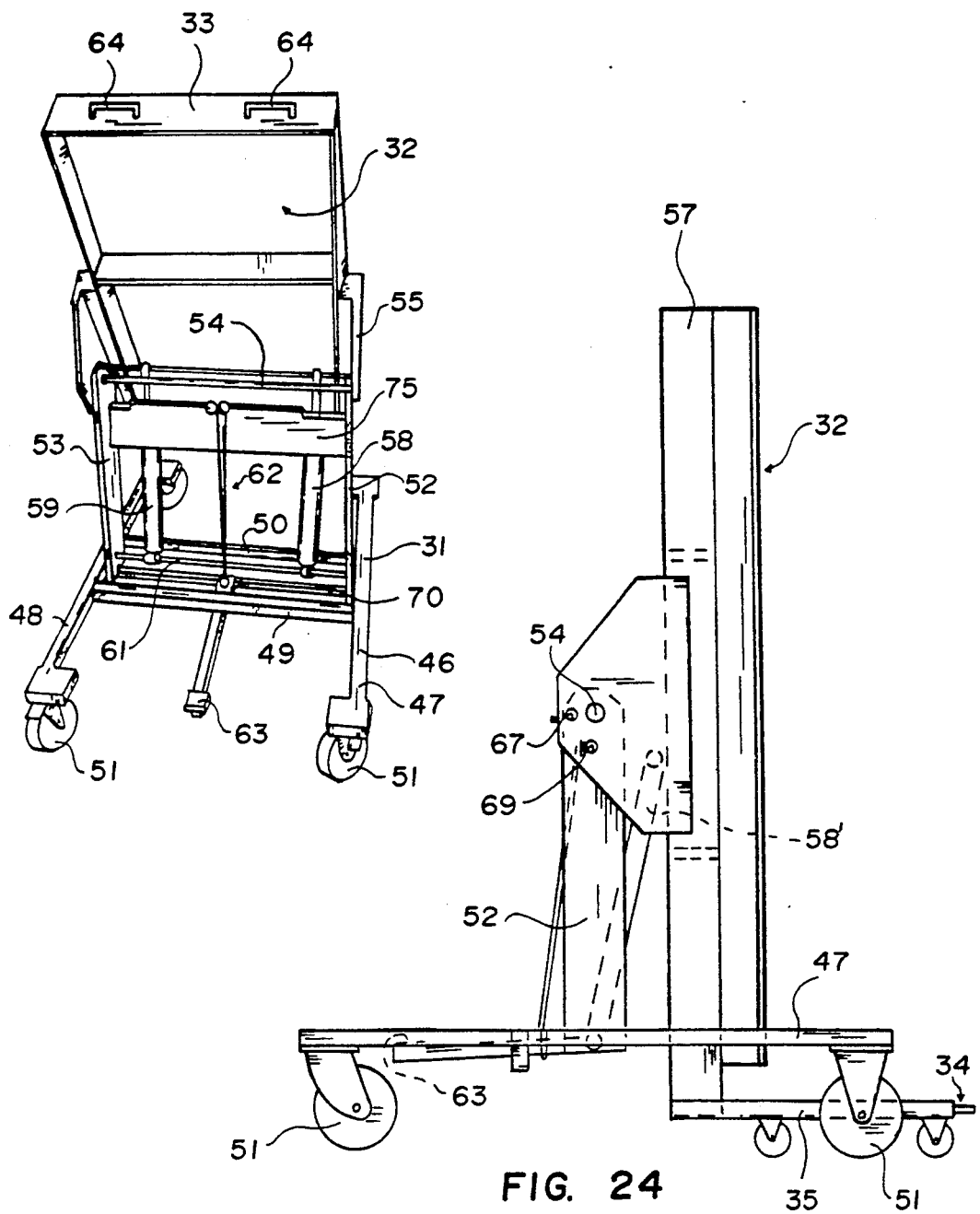

METHOD FOR HANDLING BUSINESS FORMS

BACKGROUND AND SUMMARY OF INVENTION

This invention relates to a method and apparatus for handling business forms and, more particularly, for transporting compacted forms.

This invention is an improvement on the printed forms transport (hereafter "PFT") of Wallace Computer Services, Inc., of Hillside, Ill. and also the competitive prior art transport seen in U.S. Pat. No. 5,061,233.

The PFT is a receiver for zig-zag folded forms which normally have been generated by a computer printer and folder/compactor. These machines operate at high speed and it is difficult to coordinate them with other machines employed by companies who process large volumes of business forms. Most notably, the output of the computer printer and folder/compactor goes to a machine called an inserter—sometimes referred to as a forms utilization unit. In many instances, the machinery creating the final forms is located in one section of a forms processing plant while the inserter(s) are located in another area. This has necessitated the need for transport from the first to the second area. It was for this purpose that the PFT and '233 constructions were developed.

The transports or carts of the prior art had the disadvantages of being cumbersome, expensive, and difficult to use. In particular there was a difficulty in splicing the forms from a subsequent run to a previous run so as to have continuous operation at the inserter.

All of the drawbacks of the prior art have been solved according to the instant invention by modifying the prior art PFT by providing a removable flat plate dolly at the forms entering end. This dolly not only performs the function of delimiting the length of the stack of zig-zag folded forms but additionally serves as a convenient, inexpensive and highly reliable wheeled transport between the generation and finishing areas of the plant or factory.

Other objects and advantages of the invention may be seen in the details set down in the ensuing specification.

BRIEF DESCRIPTION OF DRAWINGS

The invention will be explained in conjunction with the accompanying drawings, in which FIG. 1 is a perspective view of the prior art receiver shown during the loading operation;

FIG. 2 is a perspective view of the prior art receiver in the process of transferring the forms to the inserter;

FIG. 3 is a fragmentary perspective view of the inventive receiver from the end equipped with the novel dolly;

FIG. 4 is another perspective view of the invention shown with the dolly in loaded condition and ready for transport;

FIGS. 5-8 are schematic views showing the overall operation of the inventive receiver and relating respectively to loading, unloading onto the dolly, transporting and inserting/feeding the inserter;

FIG. 24 is another side elevational view, somewhat schematic showing the receiver with the box means vertically disposed so that the dolly is located on the floor for removal to another area; and FIG. 25 is a perspective view of the inventive receiver as seen from the closed end and with the box means tilted for compacting the stack preparatory to removal of the dolly.

DETAILED DESCRIPTION

Prior Art

Figure 9:
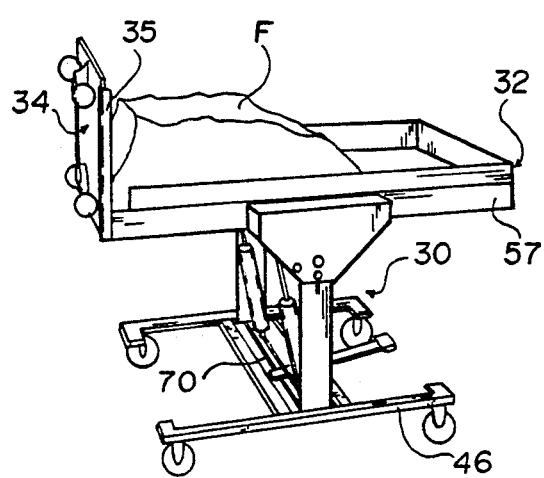
FIG. 9 is a fragmentary perspective view of the preferred embodiment of the invention and showing the dolly inserted in place at the entering end of the receiver box means preparatory to transport.

Referring to FIG. 1, the symbol FC designates generally a folder-compactor which develops a stream of zig-zag folded forms in a partially compacted condition—the forms being designated F. The forms are seen to be supported on a box means B which is the upper portion of the receiver generally designated R. The box means portion is supported on the undercarriage U portion of the receiver R. The undercarriage U includes a generally rectangular wheel-equipped chassis C.

After a predetermined number of forms have been introduced into the box means B, an end plate E (see FIG. 2) is inserted to delimit the end or size of the stack—the end plate E being seen at the center bottom of FIG. 2. Thereafter, the receiver is moved from the folder/compactor FC to the inserter I. In FIG. 2, the forms F are being seen in the process of being introduced into the inserter I—being threaded over turning means T at both the top and bottom of the box means B.

The Invention

Reference is now made to FIG. 3 wherein the numeral 30 designates generally the inventive receiver which includes an undercarriage 31 which is generally the same as the undercarriage of the prior art—but with changes in construction to permit the novel operation of the instant invention.

The number 32 designates a box means mounted on the undercarriage 31 which is generally analogous in function to that of the prior art box means B. Here the end wall 33 at the closed end of the box means 32 is straight—not having the curved end wall configuration W of the prior art PFT of FIG. 1.

A significant change from the prior art is found in the removably mounted dolly 34 which is supported on posts 35 extending upwardly from the corners at the open end of the box means 32.

The dolly 34 includes by having a flat plate 36 and four casters or wheels 37 to promote easy shifting of the dolly 34 from place to place. Additionally, the underside of the plate 36 has retractable strap means as at 38 and 39 which develop the confinement of completed stacks as seen in FIG. 4. The straps 38, 39 are similar to automobile seat belts in being spring loaded for easy retractability. However, other strapping constructions may be employed.

In FIG. 4, the box means 32 is seen to be vertically oriented so that the dolly 34 can be rolled away from the posts 35 and wherein the stack S (topped with an anti-curl plate 40) is strapped in place by the straps 38 and 39. A variety of strapping can be employed but we find it advantageous to use strapping with a Velcro-type fastening.

Operation Generally

In FIG. 5, the receiver 30 is seen in the process of being loaded. For example, the loading comes in from the folder/compactor FC to the box means 32 and wherein the undercarriage 31 has the box mean 32 disposed horizontally. The posts 35 are ready for dolly insertion.

FIG. 6 illustrates a subsequent step in the operation where the stack is now unloaded from the box means 32 and supported on the dolly 34. FIG. 7 shows the dolly 34 with the strapping 38, 39 around the stack of forms in the process of being transported from one location to another.

Finally, FIG. 8 shows the step of inserting/feeding which embodies the top forms of the stack S being fed into the inserter I. It will be appreciated that it is simple to switch from face up to face down feeding merely by rotating the dolly 180°. This is in studied contrast to the operation of the prior art transports which required a laborious rethreading operation.

Operation in Detail

Reference is first made to FIG. 9. There, the receiver 30 has been moved away from the folder/compactor and the dolly 34 has been installed in the posts 35 so as to serve as a limiting means or separator between two consecutive sets of zig-zag folded forms.

Figure 10:
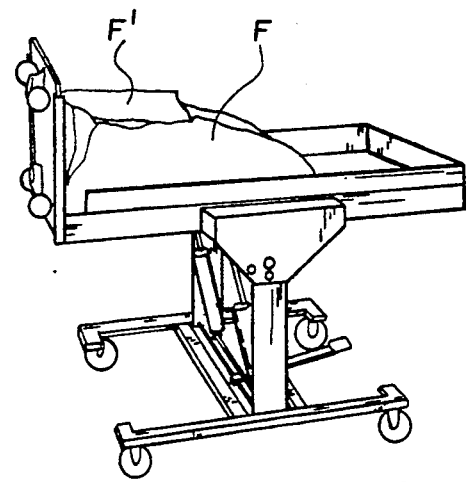
FIG. 10 is another fragmentary perspective view which differs from FIG. 9 in showing that a portion of the zig-zag folded forms at the very end of the run has been pulled away from the dolly and laid on the zig-zag folded stack.
Figure 17:
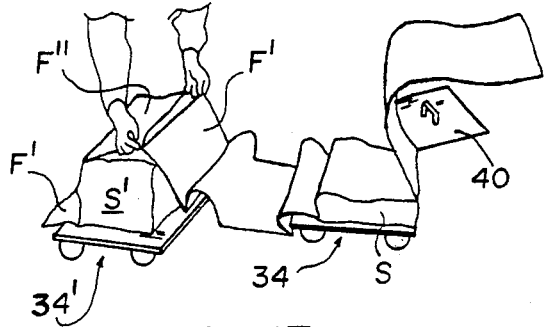
FIG. 17 is a fragmentary perspective view showing a new stack on a new dolly having its top or leading end form spliced to the trailing end form of a preceding stack, the preceding stack being in the process of being fed into the inserter.
Figure 18:
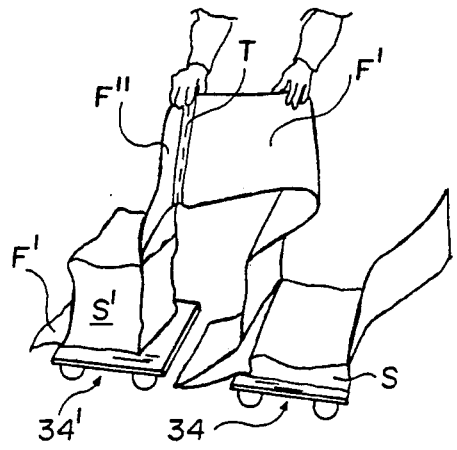
FIG. 18 is another fragmentary perspective view showing the splicing being completed between the two stacks and the previous stack having its forms fed into the inserter.

As seen in FIG. 10, the next step in the operation is to pull several trailing end forms F' away from the dolly 35 and lay the same over the zig-zag folded accumulation F—not yet a stack. These forms F'—that have been withdrawn from what will become the bottom of the stack—will be used as seen in FIGS. 17 and 18 to serve as the downstream portion of the splice with the top forms of a following stack. Thus, the invention provides the desired "first in, first out" operation of the form without difficulty.

Figure 11:
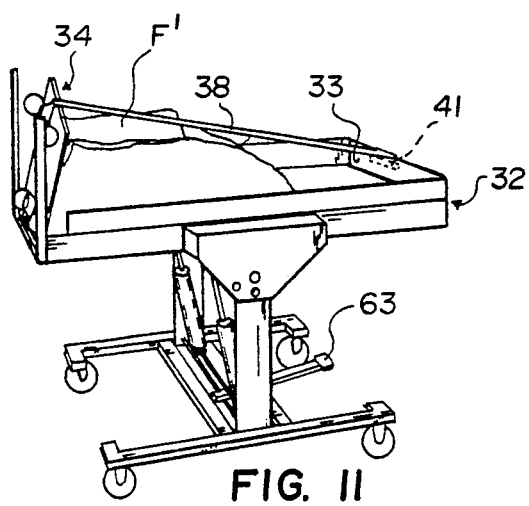
FIG. 11 is another fragmentary perspective view and showing the use of a strap for securing the zig-zag folded stack in place.

In FIG. 11, the free end of the strap 38 is seen to be secured at 41 to the closed end wall 33 of the box means 32—a suitable latching means 41 being provided on the outside of end wall 33 in the form of a Velcro-type strip.

Figure 12:
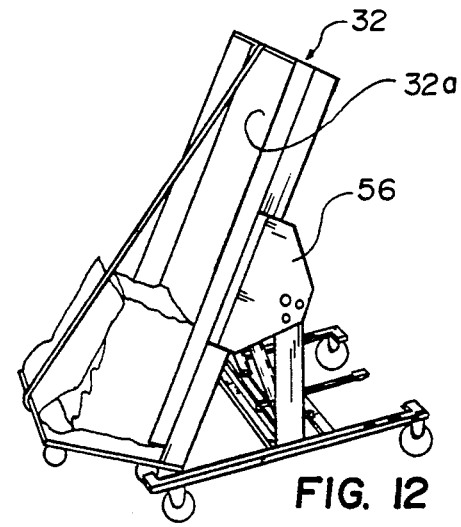
FIG. 12 is another fragmentary perspective view and features a subsequent step in the operation of the invention wherein the box means of the receiver is tilted from the condition illustrated in FIG. 11.

In FIG. 12, the now-strapped accumulation of forms with the trailing end forms F' also strapped, is pivoted to about a 70° orientation and becomes, for all practical purposes, a compacted stack. This 70° arc was the extent of the pivoting allowed in the prior art PFT. It is utilized here to cause the various forms in the stack to settle in a stable position prior to removal of the dolly. Pivoting from the horizontal directly to the vertical sometimes causes, the stack to become serpentine —so that it might fall off the dolly during movement from one work station to another. But by momentarily stopping the pivotal movement before reaching the vertical, the forms can even themselves out against the bottom wall 32a of the box means 32.

Figure 13:
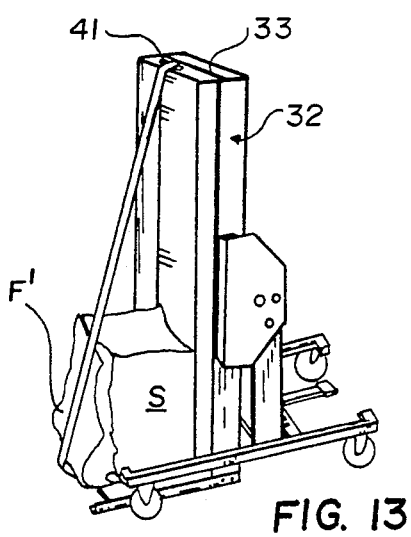
FIG. 13 is another fragmentary perspective view of the operation of the invention and with the receiver box means disposed vertically so that the stack is entirely supported on the dolly.

In FIG. 13, the box means 32 has been pivoted to the vertical orientation so that the stack of forms (still strapped) is supported on the dolly in a stabilized fashion. Such an orientation was not possible nor contemplated in the prior art PFT.

Figure 14:
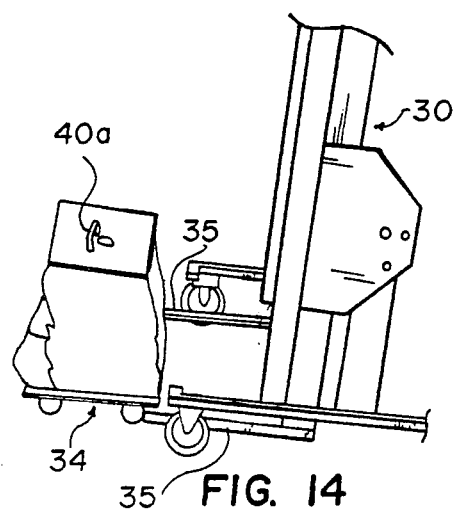
FIG. 14 is a perspective view of a subsequent operation wherein the dolly has been removed from its position on the receiver and a flat plate pressed on the stack to prevent undesirable curl.

In FIG. 14, the strap 38 has been detached from the latching means 41 and the anti-curl plate 40 is seen laying on the top of the stack. The dolly 34 has been slid off of the angle iron posts 35 and is ready for strapping and relocation.

Figure 15:
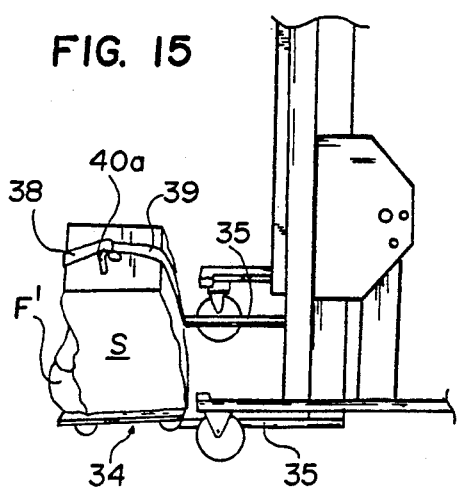
FIG. 15 is a fragmentary perspective view of the dolly supporting the stack and equipped with the anti-curl plate and with the stack strapped in place.
Figure 16:
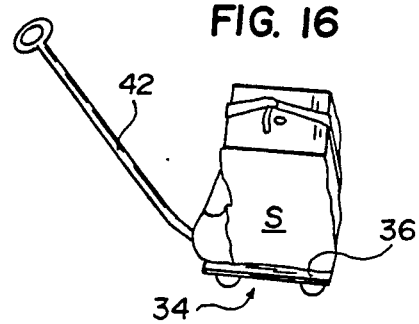
FIG. 16 is another fragmentary perspective view showing the dolly in the process of being moved from the folder/compactor location to an inserter location.

In FIG. 15 the straps 38, 39 have been installed around the stacks and the plate 40—more particularly through the U-shaped handle 40a of the plate 40. In FIG. 16, a pulling handle 42 has been installed in appropriate holes 36a (see FIG. 3) in the plate 36 of the dolly 34 so that the dolly can be pulled easily from the stacking location to the inserter location.

The remaining views FIGS. 17-21 depict operations performed at the inserter site. In FIG. 17 the leading or top end forms F'' of a subsequent stack S' on the dolly 34' are being aligned with the trailing end forms F' of the stack S being fed into the inserter. Again, the stack S' has its trailing end forms $F^1$ pulled out so as to be ready for splicing when the stack S' is being fed into the inserter. It will be noted that the anti-curl plate 40 has been removed.

The splicing is depicted in FIG. 18 and thereafter the feeding of the forms from the stack S is continued until forms are depleted and then taken from the stack S'. Thereafter, the dolly 34 can be removed from its location adjacent the inserter and the forms from stack S' on dolly 34' fed into the inserter without pause or delay.

Figure 19:
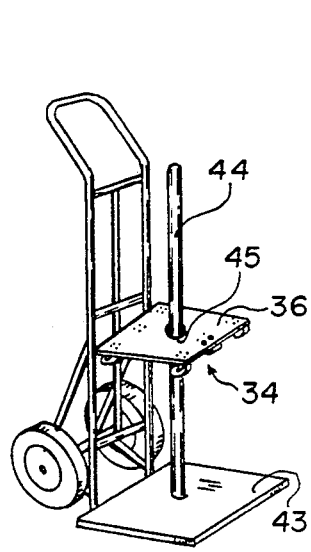
FIG. 19 is a perspective view of a hand truck advantageously employed in collecting empty dollies and showing a first dolly being installed on the hand truck for removal from the inserter area back to the folder/compactor area.
Figure 20:
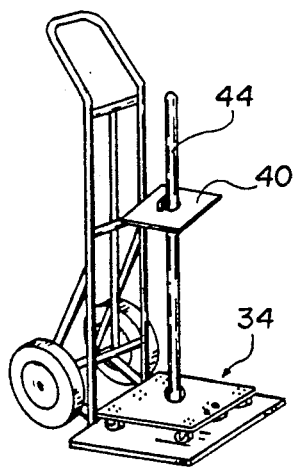
FIG. 20 is a view subsequent in the operation of the phase of the invention of returning the dolly to the folder/compactor area wherein the anti-curl plate is in the process of being installed over the dolly.
Figure 21:
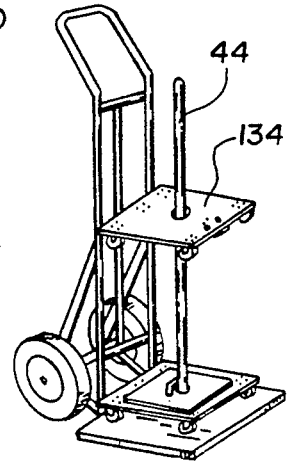
FIG. 21 is still another perspective view showing a second dolly being installed on the hand truck above the anti-curl plate which was installed in the showing in FIG. 20.

After a dolly has been emptied of its stack, it is placed on a hand truck 43 (see FIG. 19). The hand truck is advantageously equipped with a pipe rod 44 and the dolly 34 has an aligning hole 45 for insertion over the pipe rod 44. The next step is seen in FIG. 20 and consists of installing the anti-curl plate 40 over the pipe rod 44—the anti-curl plate being a partner with the dolly as can be seen in FIG. 17. Thereafter, another dolly 134 can be installed over the pipe rod 44 and thus a whole series of dollies and anti-curl plates are installed on the hand truck 43 for convenient and easy relocation to the folder/compactor site.

Undercarriage

The undercarriage 31 is seen in greater detail in FIGS. 22-25. Turning first to FIG. 25, the undercarriage is seen to include a generally H-shaped chassis 46 (also see FIG. 9) which is made up of longitudinal members 47, 48 integrated with transverse members 49 and 50 near the mid points of the longitudinal members, i.e., spaced from the ends. Mounted at the ends of the longitudinal members 47, 48 are wheels or casters 51—four of which are provided as can be appreciated from a comparison of FIGS. 24 and 25.

A pair of uprights 52, 53 extend upwardly from the longitudinal members 47, 48 respectively (see also FIG. 22) and are positioned between the transverse members 49, 50. At their upper ends, the uprights 52, 53 are connected by a cross shaft 54.

Figure 22:
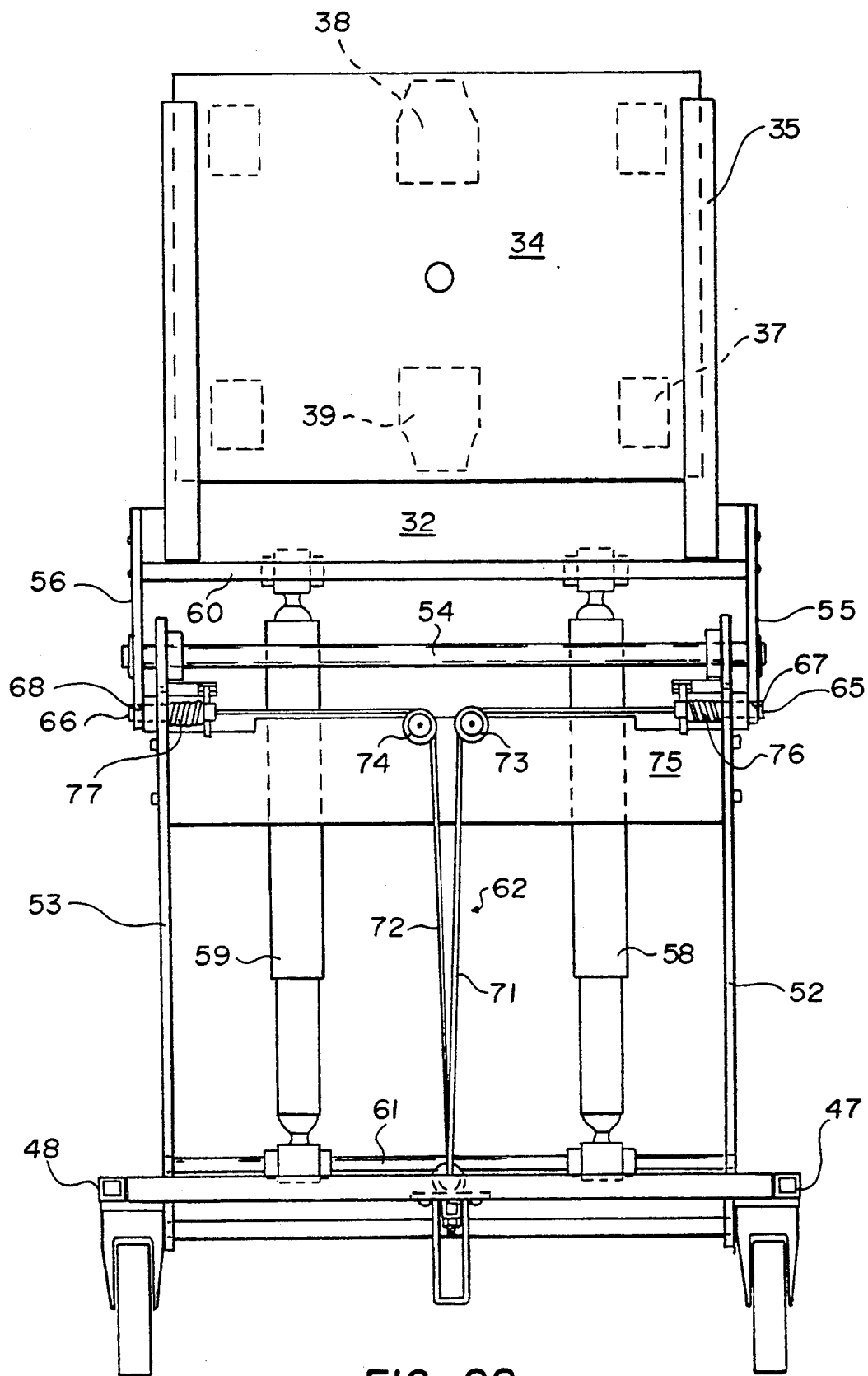
FIG. 22 is a fragmentary end elevational view of the inventive receiver as seen from the "closed" end of the box means which supports the compacted stack and which features a part of the supporting surface of the dolly at the upper portion of the view.
Figure 23:
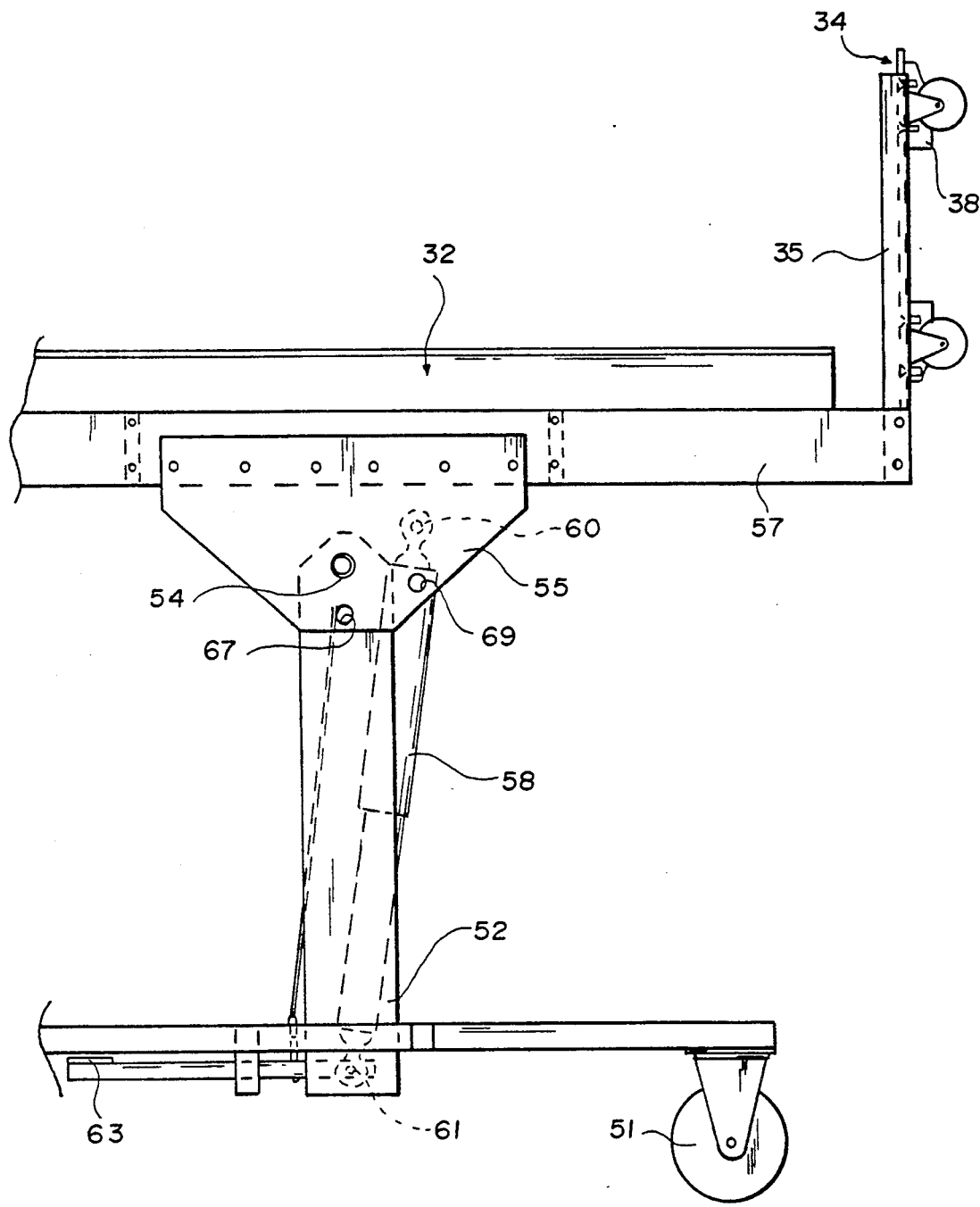
FIG. 23 is a side elevational view of the inventive receiver in the condition depicted in FIG. 22.

Journaled on the cross shaft 54 are trapezoidally shaped plates 55 and 56 (compare the upper portions of FIGS. 22 and 23). Fixed to the trapezoidally shaped plates 55, 56 is a subframe 57 which is generally rectangular in outline—and which carries the box means 32—see, for example, FIG. 9. The subframe 57 and therefore the box means 32 are pivotable between a loading position (horizontal) as seen in FIG. 23 and a discharge position (vertical) as seen in FIG. 24.

Interconnected between the trapezoidally shaped plates 55, 56 and the frame 46 are a pair of shock absorbers 58, 59—best seen in FIG. 22. More particularly, the upper ends of the shock absorbers 58, 59 are pivotally connected to a cross shaft 60 which extends between the trapezoidally shaped plates 55, 56. At their bottom ends, the shock absorbers 58, 59 are pivotally connected to a lower cross shaft 61 (still referring to FIG. 22). It will be noted particularly from FIG. 23 that the upper connection of the shock absorbers to the cross shaft 60 is eccentric to the cross shaft 54. The cross shaft 61 to which the bottom ends of the shock absorbers 58, 59 are connected is itself interconnected between the lower extremities of the uprights 52, 53.

A latching means generally designated 62 and which includes a foot pedal 63 (see the lower left hand portion of FIG. 23) is provided to maintain the box means 32 in two different orientations. The details of the latching means 62 will be described hereinafter but first we describe the operation of the parts of the undercarriage 31 described thus far.

Undercarriage Operation

The beginning of the operation of the undercarriage starts with the box means 32 oriented horizontally as seen in FIG. 23. Depressing the foot pedal 63 unlatches the upper portion of the undercarriage so as to permit pivoting movement of the box means 32. This is conveniently started by grasping the handle means 64 on the closed end wall 33 of the box means 32 (see the upper portion of FIG. 25). The box means 32 and the subframe 57 can then be pivoted away from its horizontal orientation. It will be appreciated that at this stage, the dolly 34 is already installed on the posts 35 (see particularly FIG. 23). As lifting pressure is exerted on the box means 32 through the handle means 64, the shock absorbers 58, 59 contract from the showings in FIGS. 22, 23 to that illustrated schematically in FIG. 24 and designated 58'.

Latching Means

The latching means 62 can be best appreciated from FIG. 22 and include spring-loaded dowels 65, 66 which engage holes in the trapezoidally shaped plates 55, 56 in different portions thereof. For example, in FIG. 23 where the box means 32 is disposed horizontally, the dowels 65, 66 engage aligned openings 67, 68 (see also FIG. 22) in the plates 55, 56 respectively.

We also provide a second pair of openings as at 69 (see the upper central portion of FIG. 23) for maintaining the box means 32 in an orientation of about 70° away from the horizontal. This permits an advantageous further compaction of the now-developing stack of predetermined number of forms. This was as far as the box means B of the prior art PFT was able to pivot (see FIG. 2). This limitation occurred because the chassis C of the prior art PFT was rectangular rather than H-shaped, thereby preventing pivoting of the box means 32 to a vertical orientation. Also, because there was no thinking about a vertical orientation in the prior art PFT, the sides of the generally rectangular chassis C were closer than what we have provided in the instant invention. However, the latching means of the prior art PFT was generally the same as depicted here, i.e., the use of a pedal actuated dowels to fix the box means B in a horizontal loading position and a 70° position—the difference being that in the prior art the 70° position was the unloading position while here it is an intermediate position for compacting the stack prior to transfer. But for the purpose of disclosing an operative embodiment, we describe the details further of the latching means 62.

The connection between the foot pedal 63 and the dowels 65, 66 includes a pair of cables 71, 72—see the lower central portion of FIG. 22. These are partially entrained around pulleys 73, 74 which are fixed to a cross member 75—see also FIG. 25. The cables 71, 72 are threaded through the pulleys 73, 74 so as to extend transversely and are connected to the inner ends of the dowels 65, 66, respectively—as best seen in the upper left and right hand portions of FIG. 22. The dowels 65, 66 are spring-loaded as by coil springs 76, 77 so as to be urged outwardly and against the trapezoidally shaped plates 55, 56 and into engagement with openings 67, 68 (for horizontal disposition) and openings 69 (for the 70° orientation).

Summary of Operation

The invention is employed in transporting zig-zag folded, compacted forms on a receiver generally designated 30 (see FIG. 5). The receiver 30 includes an undercarriage 31 and a box means 32. As can be seen best in FIG. 3, the box means has a pair of longitudinally extending sides terminating in a closed end 33 and an open end opposite the closed end 33. The box means also has an open top and a planar bottom 32a for the support of a predetermined number of zig-zag folded forms as at F in FIG. 9. The receiver is generally of the construction of the prior art as illustrated in FIGS. 1 and 2, particularly the undercarriage portion 31. An important difference, however, is in the construction of the chassis 46 of the invention which is H-shaped as contrasted to the rectangular chassis C of the prior art PFT. It will be appreciated that the chassis 46 of the instant invention need not necessarily be H-shaped, but can take other configurations—so long as the end near the dolly has a recess permitting the box means to be disposed vertically, i.e., a generally C-shaped or open end below the open end of the box means 32.

The operation starts with the step of introducing a string of interconnected zig-zag folded, partially compacted business forms into the open end of the box means and onto the planar bottom thereof as is illustrated relative to the prior art in FIG. 1. The string of forms issues from a folder compactor FC.

In the invention, after a predetermined number of forms have been introduced into the box means 32, a flat-topped dolly 34 is inserted into posts 35 (see FIG. 3) at the open end of the box means 32. This mounting of the dolly in post means serves both to delimit and confine the predetermined number of forms which eventually will be provided in a vertical stack. The angle shaped post means permits easy insertion of the dolly and movement thereof to the FIG. 11 showing.

Once the dolly 34 has been inserted in place, the end of the now-developed predetermined number of forms which is immediately adjacent to the dolly is lifted from its position and overlaid as at F' (see FIG. 10) on the accumulated zig-zag folded predetermined number of forms. The few form lengths—a form length being defined as one or more that lie between adjacent transverse folds—constitute the last or tailing form lengths of the predetermined number just introduced into the box means 32. Thereafter, a retractable strap 38 mounted on the underside of the dolly 34 is pulled over the box means 32 and the end portion F' for securement to a fastening portion 41—as seen in FIG. 11. We have found it advantageous to equip the end portions of the straps 38, 39 with Velcro-type fastening means and the same can be used for the portion 41. With the predetermined number of forms arranged as seen in FIG. 11 and with the trailing end portion F' superposed on the predetermined number of forms as seen in FIG. 11, the box means 32 is pivoted through about a 70° arc as depicted in FIG. 12. This serves to further compact—or recompact—the predetermined number of forms also without the possibility of the forms teetering on the dolly which could occur should the box means 32 be pivoted from the horizontal directly through a 90° arc to the vertical.

To achieve this pivoting, the foot pedal 63 (see FIGS. 11 and 23) is depressed which retracts dowels 65, 66 (see the upper central right and left hand portions of FIG. 22) from latching openings 67, 68 in the trapezoidally shaped mounting plates 55, 56 (compare the upper left and right hand portions of FIG. 22 with the upper central portion of FIG. 23). This retraction of the dowels 65, 66 permits the box means 32 to be pivoted through a vertical arc which can be achieved conveniently by grasping the handle means 64 on the closed end wall 33 of the box means 32 as seen in the upper portion of FIG. 25. The pivoting is against the urging of shock absorbers 58, 59 which are interconnected between the box means (via the trapezoidally shaped plates 55, 56) and a bottom portion of the receiver, notably the bottom portions of uprights 52, 53 (see the lower right and left hand portions of FIG. 22).

After the box means 32 has been pivoted to the 70° orientation as depicted in FIG. 12 wherein the dowels now enter the aligned openings 69 (compare FIG. 12 with FIGS. 23 and 24), the predetermined number of forms now recompacted into a stack, is oriented vertically as seen in FIG. 13 with the stack being designated by the symbol S.

The next step in the operation is depicted in FIG. 14 where the stack S which is independently supported on the dolly 34 is moved away from the receiver 30 and, more particularly, off of the post means 35 which had initially supported the dolly when it was first inserted to delimit and confine the predetermined number of forms.

Also shown in FIG. 14 is the application of an anti-curl plate 40 on the top of the stack S and which consists of a planar plate advantageously equipped with an integral handle of inverted U-shape as at 40a.

The next step in the procedure is to clamp the stack S against the dolly 34 as illustrated in FIG. 15 so that the movement of the dolly 34 to a different location will not disturb the stack S. At this time, the trailing end portion F' is also confined advantageously by the straps 38, 39 by virtue of the straps being located along the sides of the dolly 34 that are aligned with the folds of the zig-zag folded stack S.

The dolly includes a flat plate 36 (see FIGS. 16 and 19) which is equipped with a pair of openings 36a—see FIG. 19. It is into these openings that the pulling handle means 42 is inserted as seen in FIG. 16 and the dolly 36 relocated to an area or position of further processing. Normally this will be a processing machine such as an inserter or stuffer wherein the business forms which have been previously printed with variable information (name, address, billing in dollars, etc.) are inserted into envelopes along with advertising or other promotional material.

At this new site, as seen in FIG. 17, the anti-curling plate 40 is removed and the end portion F' is brought up the top of the stack S' and aligned with the trailing form F" of an almost depleted stack S. The portions F' and F" are spliced together by means of tape T (see FIG. 18) so that the introduction of forms into the inserter I (see FIG. 2) can be carried out without stopping. Also, it will be appreciated that the forms are processed in a "first in-first out" sequence. In other words, the form lengths which are first printed with variable information by a computer printer associated with the folder compactor FC are those that are first introduced into the inserter I—and without any difficult intervening manipulative steps. Further, with this splicing, it does not make any difference where the dolly is inserted to limit the number of forms transferred. The last of one stack always is connected to the first of the next stack.

When a dolly 34 has been freed from its associated stack, it can be conveniently carried to a nearby hand truck 43 which is equipped with an upright pole 44. Each dolly 34 is equipped with a central opening 45 which is generally within the rectangular configuration defined by the casters 37 on the dolly 34 and which fits over the pole 44—as can be seen in FIG. 19. Thereafter, the associated anti-curl plate 40 is also ensleeved over the pole 44 by virtue of being equipped with a similar opening and thereafter the sequence repeated for further dollies as at 134' in FIG. 21. It will be appreciated that it is only necessary to have one receiver which is reasonably complicated and therefore expensive whereas an unlimited number of inexpensive, uncomplicated dollies can be used in the inventive procedure.

While in the foregoing specification a detailed description of an embodiment of the invention has been set down for the purpose of illustration, many variations in the details hereingiven may be made by those skilled in the art without departing from the spirit and scope of the invention.

We claim:

1. A method for handling business forms comprising the steps of:

providing a receiver including an undercarriage, a generally rectangular box means pivotally supported on said undercarriage, said box means having a pair of sides, an open end for receiving forms and a closed end, an open top and a planar bottom, post means on said box means at said open end, introducing a string of interconnected zig-zag folded compacted business forms into said open end and onto said planar bottom, after a predetermined number of forms have been introduced into said box means, inserting a flat dolly into said post means to delimit and confine said predetermined number of forms, pivoting said box means through a vertical arc to support said predetermined number of forms on said dolly as a stack while said dolly is rollably supported on a floor, detaching said dolly and said predetermined form stack from said post means, moving said dolly with said stack of forms to a location remote from said receiver, and introducing said forms sequentially into a forms processing machine.

2. The method of claim 1 including the step of removing from said predetermined number of forms when said number is supported on said box means and when said box means is horizontally oriented, a trailing end portion of said predetermined number of forms adjacent said dolly and, after the dolly-supported stack has been relocated and is in the process of being fed into said processing machine, splicing the last form of said end portion to the top form of a subsequent stack.

3. The method of claim 2 including the step of laying the said end portion on top of the predetermined number when said predetermined number is supported on a horizontally oriented box means and, incident to said dolly being removed from said post means, clamping said end portion to the side of a now vertically extending stack of said predetermined number of forms supported on said dolly.

4. The method of claim 3 in which said steps include locating retractable straps on the sides of said dolly adjacent the folds of said predetermined stack.

5. The method of claim 1 including the step of releasably confining said predetermined number form stack on said dolly during movement thereof from said receiver to said processing machine, and releasing the confinement of said forms prior to introducing said forms into said processing machine.

6. The method of claim 1 including the step of providing an anti-curl plate for positioning atop a predetermined form stack, and superposing said anti-curl plate on said predetermined number stack.

7. The method of claim 6 including the step of providing strap means for said dolly and encirclably confining said anti-curl plate and predetermined stack on said dolly with said strap means.

8. The method of claim 1 including the step of pivoting said box means to a position intermediate the horizontal and vertical so as to further compact said forms stack on said dolly.

9. The method of claim 8 including the step of latching said box means in said intermediate position for a short time so as to achieve the further compaction of said stack.

* * * * *